Figure 1:
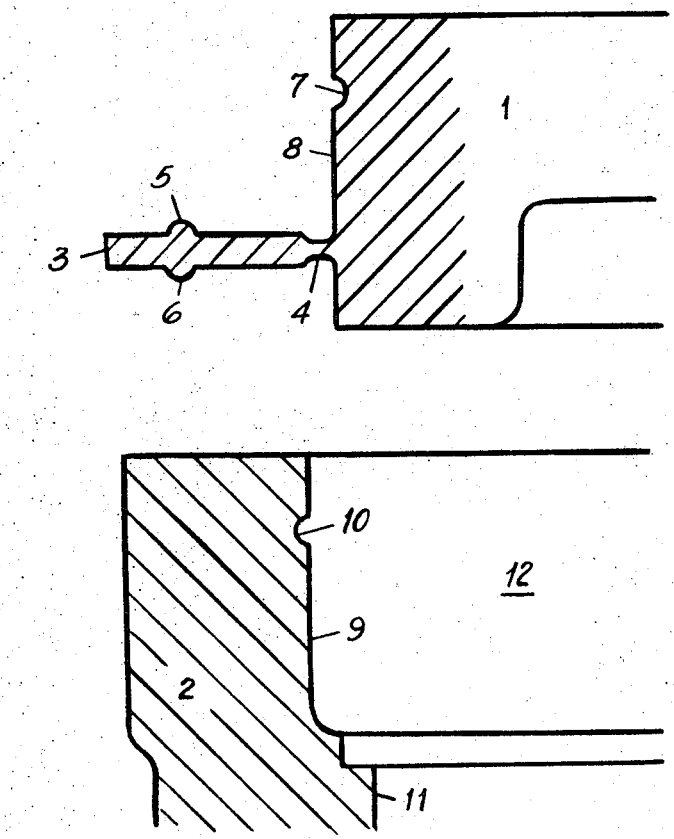
Figure 2:
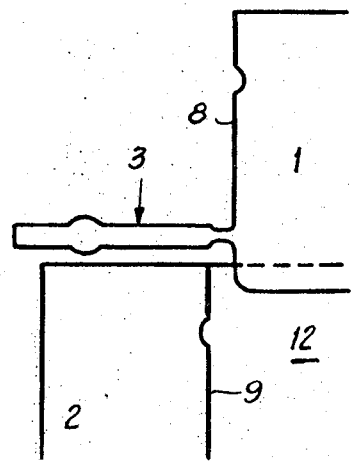
Figure 4:
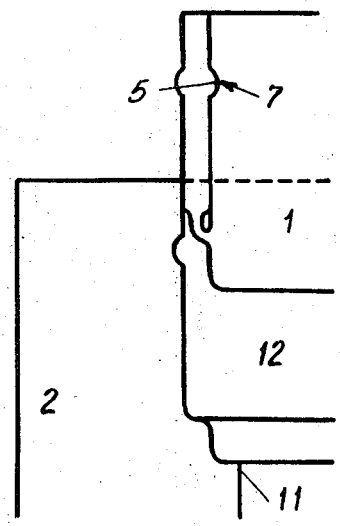
Figure 3:
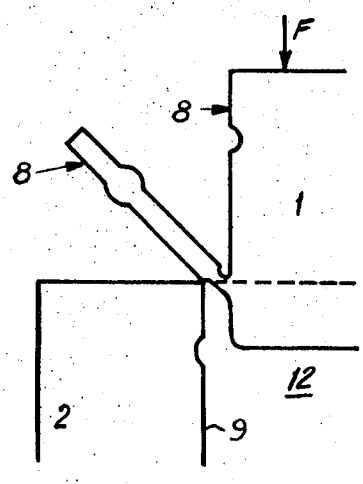
Figure 5:
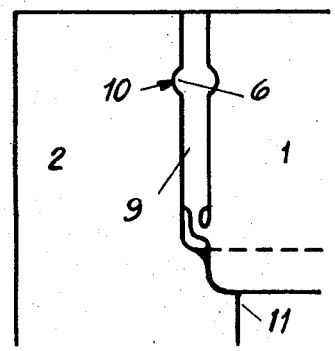
Figure 6:
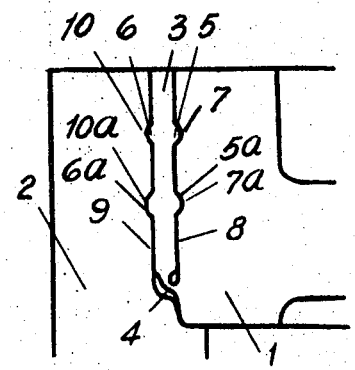
Figure 7:
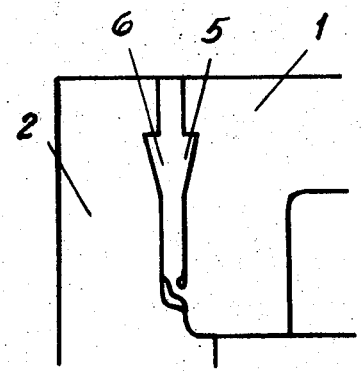
Figure 8:
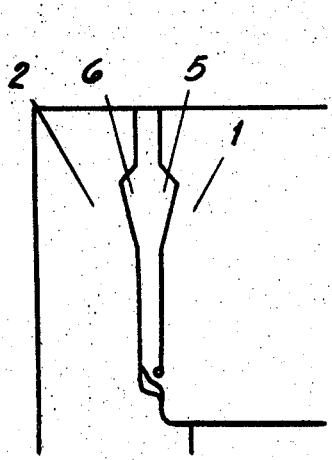
Figure 9:
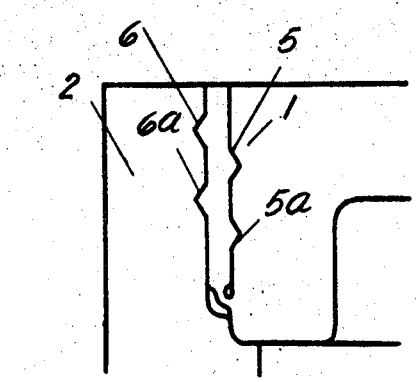

United States Patent

[11] 3,578,203

| [72] | Inventor | Maurice Mainet |
| | | Asnieres, France |
| [21] | Appl. No. | 873,914 |
| [22] | Filed | Nov. 4, 1969 |
| [45] | Patented | May 11, 1971 |
| [73] | Assignee | Produits Chimiques Pechiney Saint-Gobain |
| | | Neuilly-sur-Seine, France |
| [32] | Priority | Nov. 8, 1968 |
| [33] | | France |
| [31] | | 173,071 |

[54] SEALING ASSEMBLY
18 Claims, 9 Drawing Figs.

[52] U.S. Cl. ..................................................... 220/46,
215/47, 220/60
[51] Int. Cl. ..................................................... B65d 53/00
[50] Field of Search ........................................... 220/46, 60,
24.5; 215/47; 150/.5

[56] References Cited
UNITED STATES PATENTS

| 3,279,643 | 10/1966 | Amesbury et al. ............. | 220/24.5 |
| 3,380,610 | 4/1968 | Krieps ......................... | 215/41 |

*Primary Examiner*—George T. Hall
*Attorney*—McDougall, Hersh and Scott

ABSTRACT: A sealing assembly for forming a tight sealing relationship between at least two elements which comprises a spline member having two lateral faces having at least one convex relief element on each face, a first element and a second element, each of which have at least one wall with a recess formed therein which is adapted to receive the relief element on each lateral face of the spline member, and wherein one of the elements defines a cavity adapted to receive the other element and the spline member whereby the spline member may be interposed between the walls of the elements to form a tight seal there between when the relief elements of the spline member are engaged with the recess in each of the walls to thereby prevent movement of one of the elements to the other.

3,578,203

SEALING ASSEMBLY

This invention relates to an assembly for forming a tight sealing relationship between two or more elements.

A number of methods for assembling two or more elements in order to form a sealing relationship between them are known to the prior art. Illustrative of such methods are the methods of glueing, welding, beading, moiling as well as countless others. However, theses methods suffer from the common disadvantage that none can be applied in the same manner to a variety of materials. In addition, such methods of assembly require extensive handling operations and the ultimate use of a bonding agent, gasket or the like in order to form a tight seal. Furthermore, many of such methods, even with the use of complex bonding agents and the like, do not necessarily provide complete tightness in the seal, and this is especially true where the elements to be sealed are formed of flexible materials, without the use of a caulking agent or the like, to compensate for imperfections in the seals produced.

It is accordingly an object of the present invention to overcome the aforementioned disadvantages.

It is another object of the present invention to provide a system of at least two elements which can be assembled to form a tight seal in a simple and efficient manner.

It is a further object of the present invention to provide a sealing assembly which is not capable of being disassembled without destruction of the elements of the assembly and which is eventually invisible.

Other objects and advantages of the present invention will appear hereinafter, and, by way of illustration, not by way of limitation, reference is now made to the drawings in which:

FIG. I is a sectional view of the elements to be assembled in accordance with the present invention;

FIG. II is a sectional view of the embodiment of FIG. I in position to be assembled;

FIG. III is a sectional view of the embodiment showing the embodiment of FIG. I at an intermediate assembly stage;

FIG. IV is a sectional view of the embodiment of FIG. I at a further stage in the assembly operation;

FIG. V is a sectional view of the completed assembly of the embodiment of FIG. I;

FIG. VI is a sectional view of another embodiment of the present invention;

FIG. VII is a sectional view of yet another embodiment of the invention;

FIG. VIII is a sectional view of another assembly embodying the features of the invention; and, FIG. IX is a variation of the embodiment illustrated in FIG. VIII.

The concepts of the present invention reside in a sealing assembly which comprises a spline member having two lateral faces, each of which is provided with at least one convex relief element thereon formed by a reinforced zone of the spline cross section, and two elements which are adapted to be assembled in a sealing relationship wherein each of the elements define a surface having a groove therein adapted to receive the relief elements on the lateral faces of the spline whereby the spline may be interposed between the surfaces of the elements to form a tight seal there between when the relief elements of the spline are engaged with the recesses in the walls to thereby prevent movement of the elements relative to each other.

The resulting seal is fluid tight and cannot be opened without destroying one or both of the elements. As is apparent, the tight seal is effected without the necessity of using various caulking materials or gaskets as have heretofore been required.

A wide variety of materials may be employed in forming the elements to be assembled, although it has been found that best results are obtained when the elements to be assembled and/or the spline are formed of a material which is flexible and/or deformable such as thermoplastics and rubbers. Suitable materials include polypropylenes, polyethylenes, polyamides, polyacetals, silicone rubbers, polystyrenes, cellulosic derivatives, plasticized polyvinyl chlorides and/or copolymers of vinyl chloride with other vinyl compounds, polytetrafluorethylenes and other materials.

Referring now to the drawings, there is shown in FIG. 1 two separate elements 1 and 2 which are adapted to be assembled in a tight sealing relation. Element 1, representing, for example, a cover or lid element, has a vertical wall 8, and is provided with a spline 3 which is fixed to wall 8 by fastening means 4, which may be a thin piece of the material forming spline 3. As shown, spline 3 has a substantially rectangular cross section, but is provided with at least one bossed, and preferably symmetrical, relief elements 5 and 6 on each of the lateral surfaces of spline 3 formed by a reinforced cross-sectional zone of spline 3 having a substantially semicircular cross section. Wall 8 of element 1 is also provided with a continuous recess 7 corresponding to relief element 5 on one lateral surface of spline 3.

Element 2, representing, for example, the body of a container or the like, comprises a body 2 having an inner wall 9 corresponding to the outer wall 8 of element 1. Inner wall 9 defines a cavity 12 which is dimensioned to receive element 1 whereby element 1 serves as, for example, a cover for body 2. Wall 9 is also provided with a continuous recess 10 having a contour corresponding to relief element 6 on the lateral surface of spline 3. Positioned below and at the base of wall 9 is a shoulder 11 defined by element 2 which serves to limit the depth to which element 1 can be inserted into cavity 12 of element 2.

While elements 1 and 2 are illustrated in the drawings as being substantially cylindrical, it will be appreciated by those skilled in the art that these elements may have a wide variety of configurations, such as square, rectangular, etc.

In order to assemble elements 1 and 3 to form a tight sealing relation therebetween, and as shown in FIG. II, element 1 is placed upon element 2.

Referring now to FIG. III, as a downward force F is applied to element 1, spline 3 is caused to be folded toward wall 8 of element 1 by wall 9 of element 2. As illustrated in FIG. IV, the force F causes element 1 to be displaced into cavity 12 of element 2 whereby spline 3 is pressed against wall 8 with the result that relief element 5 on one lateral surface of spline 3 is pressed into recess 7.

As element 1 is pressed into cavity 12 of element 2, relief element 6 on the opposite lateral face of spline 3 is pressed into recess 10 formed in wall 9 of element 2, and the bottom of element 1 abuts should 11 of element 2, and the assembly is completed, as illustrated in FIG. V. Thus, it will be apparent that element 1 cannot be removed because relief elements 5 and 6, by virtue of their engagement with recesses 7 and 10, respectively, that will not permit movement of element 1 relative to element 2.

In embodiments in which elements 1 and 2 are opaque the assembly is practically invisible, and hence the assembly is rendered substantially inviolate whereby it cannot be disassembled without damage to one or both of the elements forming the assembly. In addition, the tightness of the seal between elements 1 and 2 is insured by virtue of the fact that the elements 1 and 2 fitted without clearance, with clamping or not. In addition, spline 3 is sufficiently thin so that it can be locally deformed to thereby compensate for irregularities in walls 8 and 9. This is true even in the case where fastening means 4 is either partially or entirely broken during the assembly of elements 1 and 2. In this regard as is evident to one skilled in the art, the same type of interlocking joint between elements 1 and 2 may also be provided by a spline member which is not fixed to either of elements 1 and 2.

It has been found that best results are obtained when the thickness of the spline 3, when employed according to the concepts of the present invention corresponds to between 5 and 35 percent of the wall thickness of elements 1 and 2, and preferably between 12 and 20 percent.

It will also be appreciated by those skilled in the art that spline member 3 can be provided with a plurality of bossed relief elements 5 and 6 to provide an even tighter seal between elements 1 and 2. Such an embodiment is illustrated in FIG. VI wherein spline member 3 is provided with relief elements 5 and 5a, and 6 and 6a located on the respective lateral surfaces of spline 3. Of course, when a plurality of relief elements are provided on spline 3, a plurality of recesses 7 and 7a, and 10 and 10a, respectively, are provided in walls 8 and 9, respectively, corresponding to each of the relief elements located on spline 3.

In accordance with the concepts of the present invention, the configuration or cross section of the relief elements 5 and 6, and hence the contour of the corresponding recesses is subject to considerable variation. In general, the configurations are dependent upon the tightness of the seal desired and upon the flexibility of the materials used in forming both the spline and the elements to be assembled. For example, it is possible to provide relief elements having a profile or cross section in the shape of a truncated cone, a polyangular profile, an angular profile or relief elements in the form of serrations.

Thus, in FIG. VII relief elements 5 and 6 have a cross section in the shape of a right triangle, and in FIG. VIII relief elements 5 and 6 have a cross section in the form of an oblique triangle. As shown in FIG. IX, it is possible to provide relief elements 5 and 5a and 6 and 6a in the form of serrations on both lateral faces of spline 3. As is shown in this embodiment, the serrations can be staggered along the lateral face of spline member 3 relative to the serrations of relief elements on the opposite lateral face.

Similarly, in accordance with the concept of the present invention, relief elements 5 and 5a and 6 and 6a can be provided in a continuous or discontinuous manner. If a very tight seal is desired, it is generally preferred to provide the relief elements in the form of filaments or ribs which are as long as practical.

The concepts of the present invention may also be applied in forming a tight sealing relation between elements 1 and 2 when element 1 is adapted to fit externally on element 2. In this embodiment, for convenience in the assembly of the elements, it is generally preferred that the interlocking spline 3 be integral with element 2. However, as will be appreciated by those skilled in the art, it is also possible to provide spline 3 on the surface of a wall of element 1.

The sealing assembly of the present invention may be used to form hollow articles as well as the assembling of any element with another. For example, it is possible to use the concept of the present invention to fix an element such as plate glass or a mirror on a support therefor. Other uses of the present invention will be apparent to those skilled in the art.

It will be apparent from the foregoing that I have provided a new and improved sealing assembly whereby two or more elements can be assembled in a sealed relationship without the need to employ bonding agents, gaskets and the like as have heretofore been required by the prior art.

It will be understood that various changes may be made in the details of construction and use of the present invention without departing from the spirit thereof, especially as defined the following claims.

I claim:

1. A sealing assembly for forming a tight sealing relationship between at least two separate elements which comprises a spline member having two lateral faces, each of said lateral faces having at least one convex relief element thereon, a first element and a second element, each of said first and second elements defining at least one wall, each of said walls having at least one recess formed therein adapted to receive said relief element and one of said elements defining a cavity adapted to receive the other of said elements and said spline member whereby said spline member forms a tight seal between said elements when said lateral faces of said spline member are interposed between said walls of said elements and said relief elements are engaged with said recesses in said wall to thereby prevent movement of said elements with respect to each other.

2. An assembly as defined in claim 1 wherein said spline member is fixed to one of said elements.

3. An assembly as defined in claim 1 wherein said spline member is fixed to said wall of one of said elements.

4. An assembly as defined in claim 1 wherein said spline member is deformable.

5. An assembly as defined in claim 1 wherein at least one of said elements is deformable.

6. An assembly as defined in claim 1 wherein said relief element on each of said lateral faces of said spline member are symmetrical.

7. An assembly as defined in claim 1 wherein said relief elements comprise a boss on said spline member.

8. An assembly as defined in claim 1 wherein said relief elements have a substantially semicircular cross section.

9. As assembly as defined in claim 1 wherein said relief elements have a triangular cross section.

10. An assembly as defined in claim 1 wherein said spline member has a plurality of relief elements on each of said lateral faces.

11. An assembly as defined in claim 10 wherein said lateral faces of said spline member are serrated form said plurality of relief elements.

12. An assembly as defined in claim 10 wherein the plurality of relief elements are staggered on one of said lateral faces relative to the plurality of relief elements on the other of said lateral faces.

13. An assembly as defined in claim 1 wherein the plurality of relief elements are provided in a continuous or discontinuous manner.

14. An assembly as defined in claim 1 wherein said spline member has a thickness in the range of 5 to 35 percent of the wall thickness of one of said elements.

15. An assembly as defined in claim 1 wherein said spline member has a thickness in the range of 12 to 20 percent of the thickness of one of said elements.

16. An assembly as defined in claim 1 wherein said first element is a substantially cylindrical cover defining a substantially cylindrical outer wall, said outer wall defining said recess and said second element is a substantially hollow cylindrical element having an inner wall corresponding to said outer wall, said inner wall defining said recess and defining a cavity adapted to receive said cover.

17. An assembly as defined in claim 16 which includes means for fixing said spline member to said outer wall of said cover whereby said spline member is folded along said outer wall of said cover where said cover is inserted in said cavity.

18. An assembly as defined in claim 16 which includes shoulder means defined by said cylindrical element, said shoulder means being provided at the base of said inner wall to limit the penetration of said cover into the cavity of said cylindrical element.